United States Patent
Leutner et al.

(10) Patent No.: US 6,190,567 B1
(45) Date of Patent: Feb. 20, 2001

(54) BREAKING DOWN HYDROXYLAMINE IN AQUEOUS SOLUTIONS

(75) Inventors: Bernd Leutner, Frankenthal; Frank Hanus, Angelbachtal; Hans-Michael Schneider, Worms; Otto Watzenberger; Uwe Wegmann, both of Mannheim, all of (DE)

(73) Assignee: BASF Aktiengesellschaft, Ludwigshafen (DE)

( * ) Notice: Under 35 U.S.C. 154(b), the term of this patent shall be extended for 0 days.

(21) Appl. No.: 09/327,968

(22) Filed: Jun. 8, 1999

(30) Foreign Application Priority Data

Jun. 10, 1998 (DE) .............................. 198 26 018

(51) Int. Cl.$^7$ ...................................... C02F 1/72
(52) U.S. Cl. ......................... 210/758; 210/754; 210/903
(58) Field of Search .................................. 210/753, 754, 210/758, 903, 908

(56) References Cited

U.S. PATENT DOCUMENTS 5,062,966   11/1991   Dotson et al. ..................... 210/753

FOREIGN PATENT DOCUMENTS 617366   1/1977   (SU) .

OTHER PUBLICATIONS

*Ullmann's Enz. der tech. Chem.,* vol. 1, 3rd Ed., 1951, pp. 701–712.

*Primary Examiner*—David A. Simmons
*Assistant Examiner*—Betsey Morrison Hoey
(74) *Attorney, Agent, or Firm*—Keil & Weinkauf

(57) ABSTRACT

A process for breaking down hydroxylamine in aqueous solutions, especially wastewaters, by treatment with an oxidizing agent, which comprises using as said oxidizing agent an alkali metal hypohalite or alkaline earth metal hypohalite or peroxomonosulfuric or peroxodisulfuric acid or a salt thereof and carrying out the treatment with said oxidizing agent at a pH<8.

12 Claims, No Drawings

BREAKING DOWN HYDROXYLAMINE IN AQUEOUS SOLUTIONS

The present invention relates to a process for breaking down hydroxylamine in aqueous solutions, especially in wastewaters, by treatment with an oxidizing agent.

A range of chemical processes produce wastewaters which contain hydroxylamine, whose bacterial toxicity gives rise to problems in the disposal of these wastewaters. Hydroxylamine is only moderately stable and decomposes on heating to give $NH_3$ and $N_2$ in alkaline solution and $NH_3$ and $N_2O$ in acidic solution, for example. However, the rate of these reactions is too low for the effective breakdown of hydroxylamine in wastewaters.

Hydroxylamine is a strong reducing agent and is therefore amenable in principle to oxidative decomposition; however, it is known that the salts of hydroxylamine possess considerable oxidation stability. To ensure that the hydroxylamine is readily oxidizable, the reaction with oxidizing agents takes place in a moderately or highly basic medium in which the hydroxylamine is in the form of the free base, which is less stable. Suitable oxidizing agents include oxygen, ozone, nitrites, nitrates, halogens, such as chlorine, bromine and iodine, hypohalites, such as sodium hypochlorite, potassium hypochlorite and calcium hypochlorite, hydrogen peroxide, peroxo compounds, such as peroxomonosulfates and peroxodisulfates, manganese dioxide, permanganates, chromates and dichromates.

SU 617 366 (inventor's certificate), for instance, describes a process for decomposing concentrated calcium hypochlorite solutions using hydroxylamine, which must be used in excess. U.S. Pat. No. 5,062,966 describes a process for decomposing concentrated solutions of hydroxyammonium salts by adding a base to establish a pH of >8, preferably >12, and then carrying out reaction with hypochlorite.

The known processes have the disadvantage that when other nitrogen bases are present, such as ammonia, which may be present in the hydroxylamine as a result either of the preparation process or of decomposition events, these bases are oxidized as well. This raises the consumption of oxidizing agent and may result in the formation of unwanted byproducts. In addition, the strongly basic wastewater has to be neutralized, resulting in an undesirably high salt load.

It is an object of the present invention to provide a process which enables aqueous solutions comprising hydroxylamine, especially wastewaters comprising hydroxylamine, to be broken down over a wide concentration range and down to a low residual concentration at high reaction rates. The process should also feature sufficient selectivity for hydroxylamine in the presence of other organic substances, especially ammonia and amines.

We have found that this object is achieved and that hydroxylamine can be broken down selectively in aqueous solutions, especially wastewaters, if said wastewaters are treated with hypohalites, peroxomonosulfates or peroxodisulfates at a pH <8. This could not have been expected in the light of U.S. Pat. No. 5,062,966, according to which oxidization with hypochlorite is effective only in the strongly alkaline range. In particular it was surprising that the breakdown of hydroxylamine takes place selectively at a pH<8.

The present invention therefore provides a process for breaking down hydroxylamine in aqueous solutions, especially wastewaters, by treatment with an oxidizing agent, which comprises using as said oxidizing agent an alkali metal hypohalite or alkaline earth metal hypohalite or peroxomonosulfuric or peroxodisulfuric acid or a salt thereof and carrying out treatment with the oxidizing agent at a pH<8.

The treatment with the oxidizing agent is preferably carried out at a pH in the range from 3 to 7.8, more preferably in the range from 5 to 7.5 and, with very particular preference, in the range form 6 to 7.5. Where the aqueous solutions containing hydroxylamine have a pH which is outside these ranges, it is necessary to add acids (e.g. sulfuric or hydrochloric acid) or alkalis (e.g. NaOH) to establish a pH within the range of the invention. In general, it is sufficient to establish the pH at a suitable level within the range of the invention once, before beginning the addition of the oxidizing agent; however, depending on the concentration of the hydroxylamine and on the nature and concentration of any additional substances present in the wastewaters, it may be advantageous to monitor the pH during the addition of the oxidizing agent and to regulate it accordingly if necessary.

The process of the invention is particularly suitable for breaking down hydroxylamine in aqueous solutions, especially wastewaters, having a hydroxylamine concentration of up to 20 g/l, and generally results in a residual hydroxylamine concentration of less than 100 ppm, in particular less than 25 ppm and, with particular preference, less than 10 ppm. A further particular advantage is that this process permits selective breakdown of hydroxylamine even in the presence of other organic substances, especially ammonia and amines, it being possible for the ammonia concentration to be up 10 g/l.

The process can be operated continuously or batchwise, preferably batchwise by adding the oxidizing agent to the collected hydroxylamine solution. For the batchwise breakdown of large quantities of hydroxylamine-carrying wastewaters it is advantageous to operate in alternation using at least two vessels or reactors.

Suitable oxidizing agents for treating the hydroxylamine-carrying aqueous solutions are alkali metal hypohalites, such as alkali metal hypochlorites and hypobromites, especially hypochlorites, preferably sodium hypochlorite and potassium hypochlorite, alkaline earth metal hypohalites, such as alkaline earth metal hypochlorites and hypobromites, especially magnesium hypochlorite and calcium hypochlorite, peroxomonosulfuric and peroxodisulfuric acid and their salts, such as the alkali metal salts and ammonium salts, especially sodium peroxodisulfate and potassium peroxodisulfate. Particular preference is given to sodium hypochlorite and sodium peroxodisulfate. Mixtures of two or more of the oxidizing agents can also be used.

In general, the process of the invention employs the oxidizing agents in the form of aqueous solutions. Suitable concentrations of the solutions lie within the range from 5 to 70% by weight, in particular from 10 to 50% by weight. A particularly preferred concentration range for the sodium hypochlorite solutions is from 10 to 20% by weight (from 10 to 13% active chlorine content) and, for the sodium peroxodisulfate solutions, from 20 to 50% by weight. The oxidizing agent is generally employed in an amount of from 1.1 to 3, in particular from 1.1 to 1.5, molar equivalents, 35 based on the hydroxylamine content of the aqueous solution to be treated. The oxidizing agent is added continuously or a little at a time, preferably continuously, over a period of generally from 5 to 90 minutes, preferably from 5 to 45 minutes.

For a sufficiently high breakdown rate of the hydroxylamine in combination with a very low consumption of oxidizing agent it is advantageous to ensure thorough mixing between the hydroxylamine-carrying aqueous solution and the oxidizing agent. Suitable means which enable thorough mixing are known to the skilled worker (see also Ullmanns Enzyklopadie der technischen Chemie, Vol. 1, 3rd edition, 1951, p. 701 ff.). Mixing can, generally, be carried out by means of stirrers, such as propeller, blade or paddle stirrers, in-line mixers, jet introduction devices, etc.

The reaction time to complete breakdown is an hour or less. Especially when using hypochlorite, reaction times of 10 minutes or less are required.

Preferably, process parameters such as pH, redox potential, gas evolution, temperature development and the like are used to control the addition of oxidizing agent automatically. Particular preference is given to controlling the addition of oxidizing agent by on-line measurement of the redox potential during the treatment of the invention. Electrodes suitable for measuring the redox potential are known to the skilled worker. In one particularly preferred embodiment of the process of the invention the oxidizing agent is added by a metering device to the collected hydroxylamine-carrying wastewaters such that over the course of from 5 to 90 minutes, preferably from 5 to 45 minutes, from 1.1 to 3, in particular from 1.1 to 5, molar equivalents of the oxidizing agent, based on the hydroxylamine content, are supplied continuously.

In this case the addition and amount of oxidizing agent are advantageously controlled such that the continuous addition is ended automatically when a suitable, experimentally determined redox potential difference is reached. In general, when using alkali metal hypohalites or alkaline earth metal hypohalites, a redox potential change in the range from 100 to 700 mV, in particular from 150 mV to 300 mV, over the period of the process, is a reliable indicator that breakdown of the hydroxylamine has taken place. When using alkali metal peroxodisulfates, breakdown of the hydroxylamine is reliably indicated by a redox potential change of from 600 to 1000 mV, in particular from 700 to 900 mV, over the duration of the process. Controlled in this way, the process generally leads to breakdown rates >90%, especially >95%, with a consumption of oxidizing agent of less than 2 molar equivalents.

The process of the invention can be conducted within a wide temperature range. Depending on the oxidizing agent used, the temperature chosen should be suitable for achieving a high breakdown rate with low consumption of oxidizing agent. Suitable temperatures when using hypohalites as oxidizing agents lie within the range from room temperature to 90° C., in particular within the range from 50 to 90° C. When using peroxomonosulfates or peroxodisulfates, the appropriate temperatures lie within the range from 50 to 100° C., in particular from 75 to 95° C.

The examples which follow are intended to illustrate the present invention.

EXAMPLES

I. Oxidative breakdown of hydroxylamine-containing wastewaters with sodium hypochlorite on the laboratory scale.

In a 500 ml reactor with heated and thermostat-controlled oil bath, wastewater samples of known hydroxylamine and ammonia content were conditioned to 80° C. with vigorous stirring using a magnetic stirrer (550 rpm), and the appropriate amounts of oxidizing agent (NaOCl solution with 12.5% active chlorine content) were metered in continuously at different pH values over the periods ($t_D$) indicated in the table. Following the total reaction period $t_R$ indicated in the table, the residual hydroxylamine concentration was measured. Parameters and results are summarized in Table 1. Examples B1 and B2 were conducted in the pH range of the invention, the comparative Example VB2 at a more strongly basic pH. The high selectivity of the process of the invention for hydroxylamine, even in the presence of high ammonia concentrations, is evident in the low residual concentrations of hydroxylamine with low consumption of oxidizing agent.

TABLE 1

| | T [° C.] | pH | Molar equivalents of NaOCl | $t_D$ [min] | $t_R$ [min] | $NH_2OH$ conc.[1] [mg/l] initial | final | $NH_3$ conc. [mg/l] |
|---|---|---|---|---|---|---|---|---|
| B1 | 80 | 7.5 | 2.8 | 10 | 30 | 1040 | 10 | 2500 |
| B2 | 80 | 7.8 | 1.4 | 10 | 60 | 1120 | 25 | 2500 |
| VB1 | 80 | 8.7 | 1.4 | 10 | 60 | 1120 | 780 | 2500 |

[1]The hydroxylamine concentrations were determined, after dilution if necessary, by photometric titration of the red azo dye formed by oxidation of hydroxylamine to nitrite with iodine followed by reaction with sulfanilic acid and 1-naphthylamine (Lunge's reagent).

II. Oxidative breakdown of hydroxylamine-carrying wastewaters by redox potential-controlled addition of sodium hypochlorite on the pilot plant scale.

In a 15 l reactor temperature-controlled through a jacket by means of an external cryostat and having a centrically arranged blade stirrer, a pH electrode, a Pt/3M KCl/AgCl/Ag electrode for measuring the redox potential and a metering pump (membrane pump) with a final shut-off mechanism controlled by the redox potential, 170 ml per minute of aqueous NaOCl solution (12.5% active chlorine content) were metered in with vigorous stirring to wastewater containing in each case about 15 l of hydroxylamine and ammonia (for concentrations and temperature see Table 2) until the set point of redox potential difference which shuts off the metering pump is reached. Because of the high rate of breakdown under the chosen conditions, the reaction time $t_R$ within which the desired degree of breakdown was reached is virtually the same as the metering time $t_D$. Subsequently, the residual concentration of hydroxylamine was determined photometrically using Lunge's reagent. The performance of the system was assessed by measuring the initial concentrations of hydroxylamine and ammonia in the wastewaters but carrying out the experiments uniformly, irrespective of the concentrations found, to the point where the addition of oxidizing agents is shut off, triggered by the defined redox potential difference. The inventive examples B3 and B4 demonstrate the lack of dependency of the process on the initial concentrations of hydroxylamine, and its high selectivity, even in the presence of high ammonia concentrations. The comparative Example VB2 was carried out under similar conditions but at a more strongly basic pH (9.6) and features high consumption of oxidizing agent owing to a lack of selectivity.

TABLE 2

| | T [° C.] | pH | Molar equivalents of NaOCl | $t_{D\,=\,tR}$[1] [min] | $NH_2OH$ conc.[2] [mg/l] initial | final | $NH_3$ conc. | $\Delta$[3] redox potential [mV] |
|---|---|---|---|---|---|---|---|---|
| B3 | 80 | 7.0 | 1.2 | 41 | 6020 | 9 | 4600 | 250 |
| B4 | 80 | 7.0 | 1.2 | 8 | 1020 | 3 | 4700 | 250 |
| VB2 | 80 | 9.6 | 5.4 | 40 | 1190 | 4 | 4800 | 250 |

[1]Continuous addition by means of a metering pump with a metering rate of 170 ml/min. The oxidizing agent used was 12.5% strength aqueous NaOCl solution.
[2]For determining the hydroxylamine concentrations, see Table 1, footnote 1).
[3]Measurement of redox potential by means of a Pt/3M KCl/AgCl/Ag electrode; final shut-off of the metering pump when the change in redox potential reaches a level of 250 mV.

We claim:

1. A process for breaking down hydroxylamine in aqueous solutions by treatment with an oxidizing agent, which comprises using as said oxidizing agent an alkali metal hypohalite or alkaline earth metal hypohalite or peroxomonosulfuric or peroxodisulfuric acid or a salt thereof and carrying out the treatment with said oxidizing agent at a pH<8.

2. A process as claimed in claim 1, wherein treatment with the oxidizing agent is carried out at a pH in the range from 3 to 7.8.

3. A process as claimed in claim 1, wherein said oxidizing agent is an alkali metal hypochlorite.

4. A process as claimed in claim 1, wherein from 1.1 to 3 molar equivalents of oxidizing agent are used.

5. A process as claimed in claim 1, wherein the aqueous solution contains up to 20 g/l of hydroxylamine and, if desired, up to 10 g/l of ammonia.

6. A process as claimed in claim 1, wherein treatment of the aqueous solution with the oxidizing agent takes place with thorough mixing.

7. A process as claimed in claim 1, wherein the oxidizing agent is added to the aqueous solutions.

8. A process as claimed in claim 1, wherein the oxidizing agent and the wastewater are brought together continuously.

9. A process as claimed in claim 1, wherein the treatment of the hydroxylamine-carrying aqueous solutions is carried out at a temperature in the range from room temperature to 90° C.

10. A process as claimed in claim 1, wherein the treatment of the hydroxylamine-carrying aqueous solutions is carried out at a temperature in the range from 50° C. to 100° C.

11. A process as claimed in claim 1, wherein said aqueous solutions are wastewaters.

12. A process as claimed In claim 1, wherein said oxidizing agent is sodium hypochlorite.

* * * * *